United States Patent [19]
Patel

[11] Patent Number: 4,764,831
[45] Date of Patent: Aug. 16, 1988

[54] APPARATUS AND METHOD FOR RETAINING A HEAD ARM OF A DISK DRIVE ASSEMBLY

[75] Inventor: Shailesh Patel, San Jose, Calif.

[73] Assignee: Apple Computer, Inc., Cupertino, Calif.

[21] Appl. No.: 763,933

[22] Filed: Aug. 7, 1985

[51] Int. Cl.$^4$ .......................... G11B 5/54; G11B 21/22
[52] U.S. Cl. ...................... 360/105; 360/86; 360/97
[58] Field of Search .............................. 360/86, 97–99, 360/104–106, 137

[56] References Cited

U.S. PATENT DOCUMENTS

| | | | |
|---|---|---|---|
| 4,131,921 | 12/1978 | Gruczelak | 360/86 |
| 4,139,874 | 2/1979 | Shiraishi | 360/86 |
| 4,484,241 | 11/1984 | Brende et al. | 360/105 |
| 4,489,355 | 12/1984 | Rudi | 360/96.5 |
| 4,538,193 | 8/1985 | Dimmick et al. | 360/137 |
| 4,547,823 | 10/1985 | Ri et al. | 360/137 X |
| 4,562,500 | 12/1985 | Bygdnes | 360/105 |
| 4,594,627 | 6/1986 | Viskochil et al. | 360/105 |
| 4,654,735 | 3/1987 | Izraelev et al. | 360/104 |

FOREIGN PATENT DOCUMENTS 60-214481  10/1985  Japan ...................... 360/86

OTHER PUBLICATIONS

Hearn, "Actuator Retraction Device", IBM Tech. Disc. Bull., vol. 19, No. 4, Sep. 1976.

*Primary Examiner*—Stuart N. Hecker
*Assistant Examiner*—Benjamin E. Urcia
*Attorney, Agent, or Firm*—Blakely, Sokoloff, Taylor & Zafman

[57] ABSTRACT

A disk drive which includes an automatic parking brake for retaining the driver arm in a predetermined position when power is removed from the disk drive. The brake is mounted externally to the driver arm, reducing the weight of the driver arm. The brake consists of a spring loaded member held in place during operation of the disk drive by a solenoid acting as an electromagnet. When power is cut off, the solenoid releases the member and the spring biases it against the driver arm and forces the driver arm to a parked position.

19 Claims, 6 Drawing Sheets

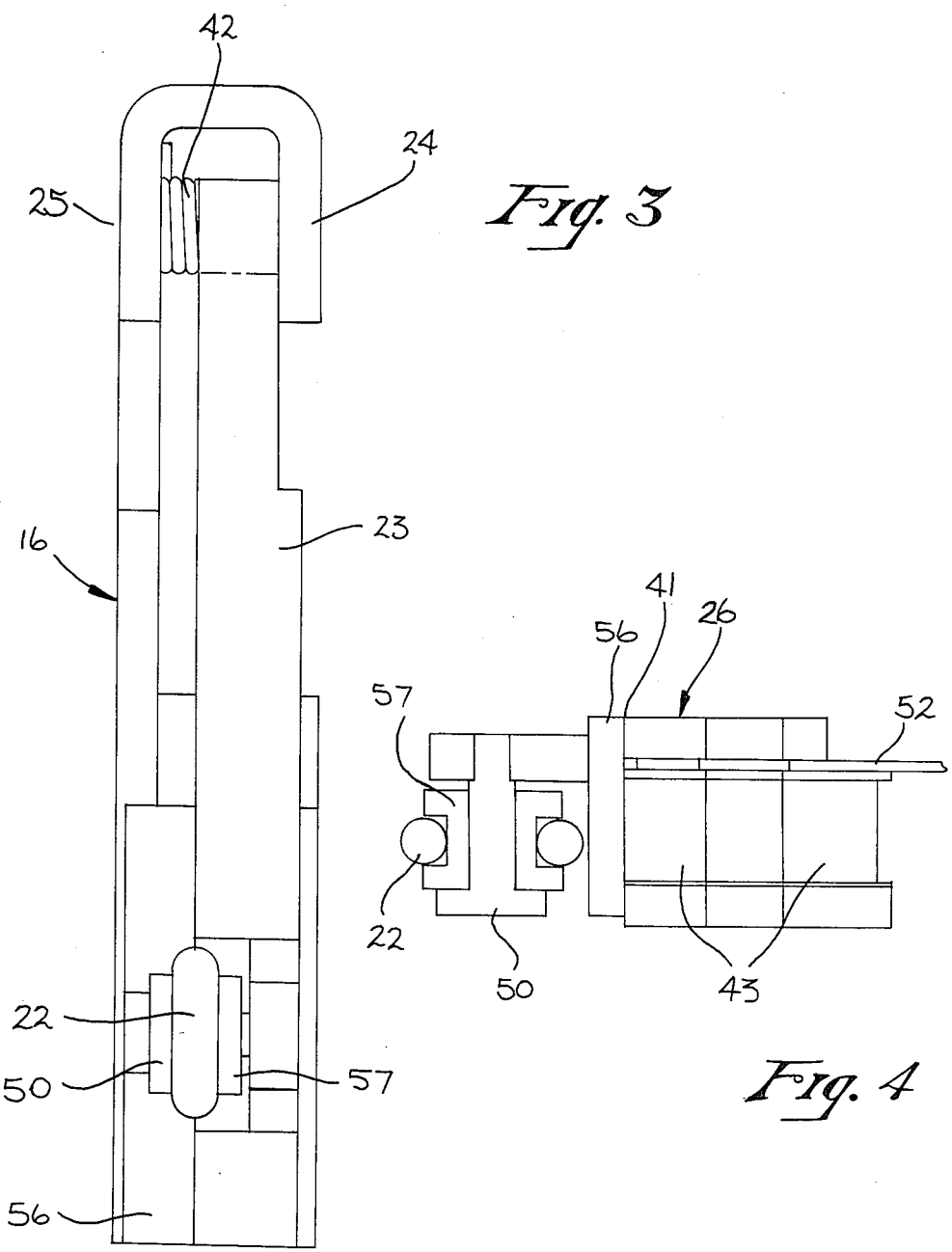

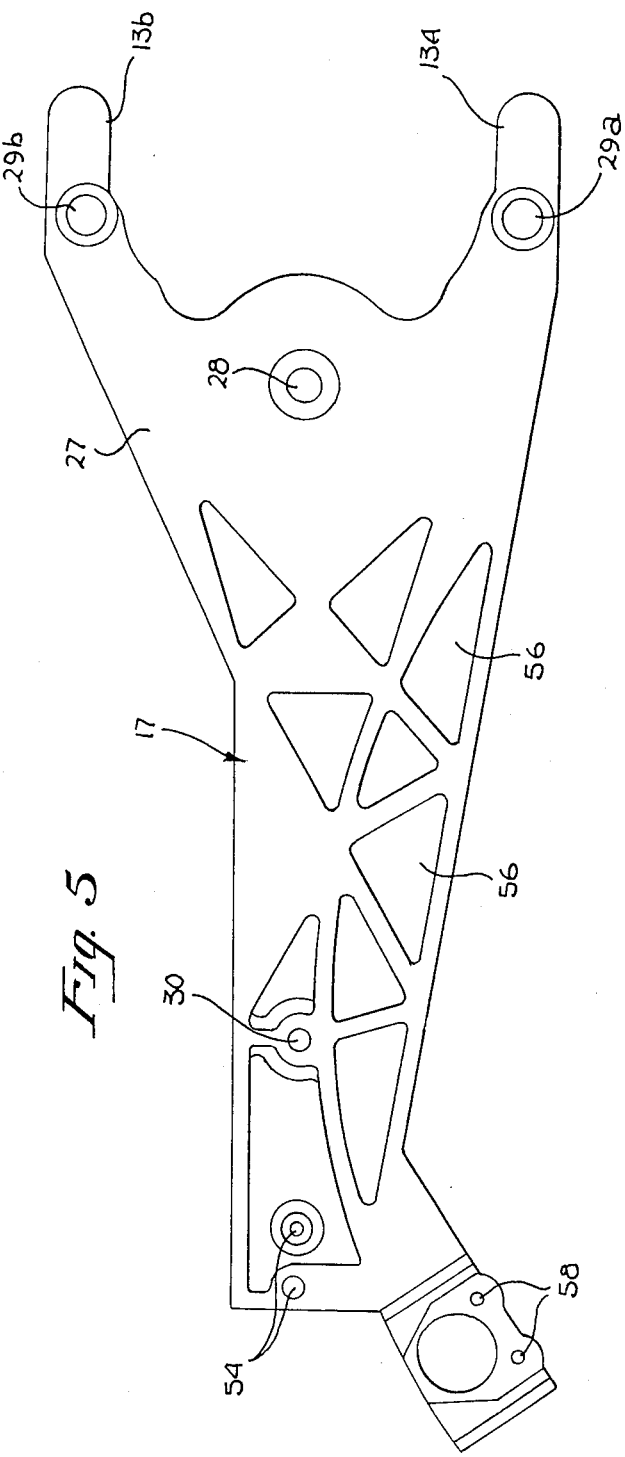
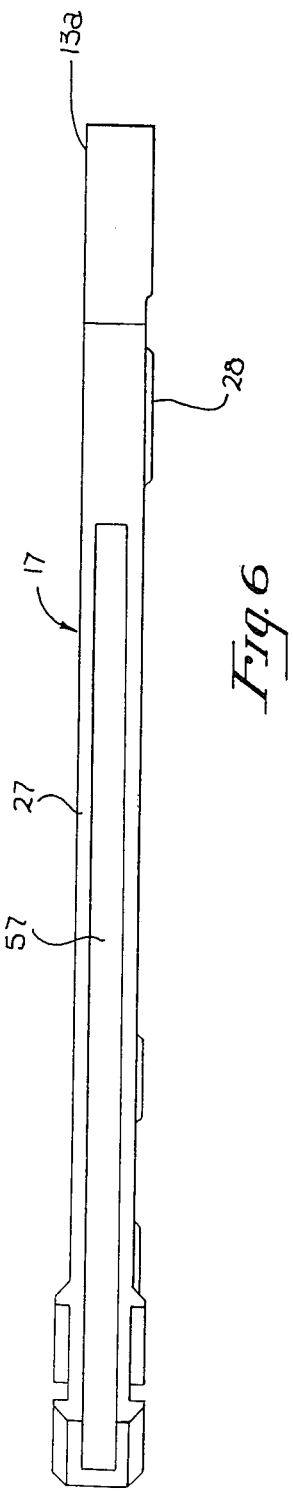

APPARATUS AND METHOD FOR RETAINING A HEAD ARM OF A DISK DRIVE ASSEMBLY

BACKGROUND OF THE INVENTION

1. Field of the Invention

This invention relates to the field of parking brakes for disk drives.

2. Art Background

Hard disk drives use aluminum disks to store blocks of data. The disks have magnetic surfaces and store data in blocks that lie along concentric circular tracks. The data is stored and recovered by read/write heads. These heads do not touch the surface of the disk, but ride on what is known as an "air bearing". Typically the heads are suspended 17-20 microinches from the surface of the disk.

The read/write heads are located on the end of a driver arm whose function is much like the tone-arm of a record player. However, since the heads of a disk drive do not touch the surface of the disk, an actuator motor provides an independent source of motion of the heads across the disk surface.

In order to optimize storage capacity, information is stored on both sides of a hard disk. Two heads are mounted on the drive arm, one for each side of the disk. The disk rotates at approximately 3000 rpm and contains a high density of storage tracks. For example, the present invention contemplates a hard disk having 600 tracks per inch.

Hard disk drives are typically used as storage devices for a host computer. When a read/write command is received from the computer, the drive arm is moved across the disk surface, seeking the appropriate track to access. The drive arm is propelled by the actuator motor.

The actuator motor consist of a fixed magnet attached to the drive housing, and a coil attached to the arm. Additional weight is added to the arm to counterbalance the arm, much like the counterweight on a record player tone arm. The driver arm is counterbalanced in order to equalize the moment of each side of the arm. The moment of the portion of arm extending on one side of the pivot point is dependant on the mass of the portion and the radius through which it acts. By counterbalancing the driver arm, the moments of each side are equal, and the arm can be operated in any plane without the need for complex servo circuitry. When the moment on each side of the pivot point is equal, the arm will not rotate unless additional force is applied to one side. Thus, changes in the plane of the arm, and shocks to the disk drive, will not cause the arm to rotate, reducing the chance of damage during shipping and other movement.

The rotation of the disk aids in maintaining the air bearing between the disk surface and the heads. When disk rotation stops, such as when the disk drive is turned off or suffers a loss of power, there is a risk that the heads may contact the disk. A head/disk contact is called a "crash" and may result in data loss or destruction of the disk medium. Additionally, when the disk drive is moved, shock may result in a head crash, again resulting in damage.

In order to prevent head crashes, or to reduce their effect, the prior art has utilized "parking tracks" and "parking brakes" on the disks and disk drives. A parking track is a track on a disk to which the heads are directed when the disk is not storing or retrieving data or when power is removed. The parking track contains no information and thus no data is lost in the event of a head crash. Similarly, should there be media damage to the parking track, there will be no reduction in the total storage capacity of the disk.

A parking brake is a device which is designed to retain the arm in a position where the heads will lie over the parking track. Prior art parking brakes have consisted of various spring mechanisms mounted on the arm assembly and activated by external controls. These devices have the disadvantage of adding to the weight, and therefore the inertia, of the driver arm. A second disadvantage is the large amount of current required by prior art parking brakes to hold them disengaged during operation of the driver arm.

As will be described, the present invention provides a parking brake mounted on the disk drive housing so as not to add to the weight of the drive arm. A coil mounted on the housing is used to hold the parking brake disengaged during operation of the disk drive. When the drive is turned off, the coil releases the brake and the brake, urged by a spring, pushes the arm to the parked position. When power is returned, the actuator motor is utilized to move the parking brake to a position where it can be held by the coil.

SUMMARY OF THE PRESENT INVENTION

The present invention utilizes a parking brake which is not mounted on the disk drive arm assembly, but rather, on the drive housing. The placement of the brake on the housing serves to reduce the weight, and therefore the inertia, of the driver arm. The brake consists of a spring loaded roller arm which is held in a disengaged position by a solenoid. When power is cut off from the disk drive, the solenoid deactivates, releasing the brake arm. The brake contacts the driver arm and forces it to the parked position, holding it in place until power is supplied to the disk drive and solenoid. The present invention is realized in a disk drive system which provides storage capabilities to, for example, a host computer. The disk drive includes a hard disk mounted on a spindle which rotates the disk. The disk contains information data tracks on each side. These tracks are accessed by read/write heads which are attached to a driver arm. The heads are swept over the surface of the disk by an actuator motor assembly. Connecting cables provide a means of interfacing the disk drive to the host computer. The disk drive is mounted in a low profile housing. A cover on the housing protects the disk drive from environmental contamination.

BRIEF DESCRIPTION OF THE DRAWINGS

FIG. 3 is a side view of the parking brake of FIG. 2.

FIG. 4 is a cross-sectional view of the parking brake of FIG. 2, generally taken through section line 4—4 of FIG. 2.

FIG. 5 is an expanded view of the arm assembly shown in FIG. 1.

FIG. 6 is a cross-sectional view of the arm of FIG. 5, generally taken through section line 6—6 of FIG. 5.

DETAILED DESCRIPTION OF THE INVENTION

A disk drive assembly is described which is particularly suitable for use with hard disks. In the following description, numerous specific parts are described in detail in order to provide a thorough understanding of the present invention. However, it will be obvious to one skilled in the art that the inventive concepts described may be employed without the described embodiments. In other instances, well-known parts have not been described in detail in order not to obscure the present invention unnecessarily.

Figure 1:
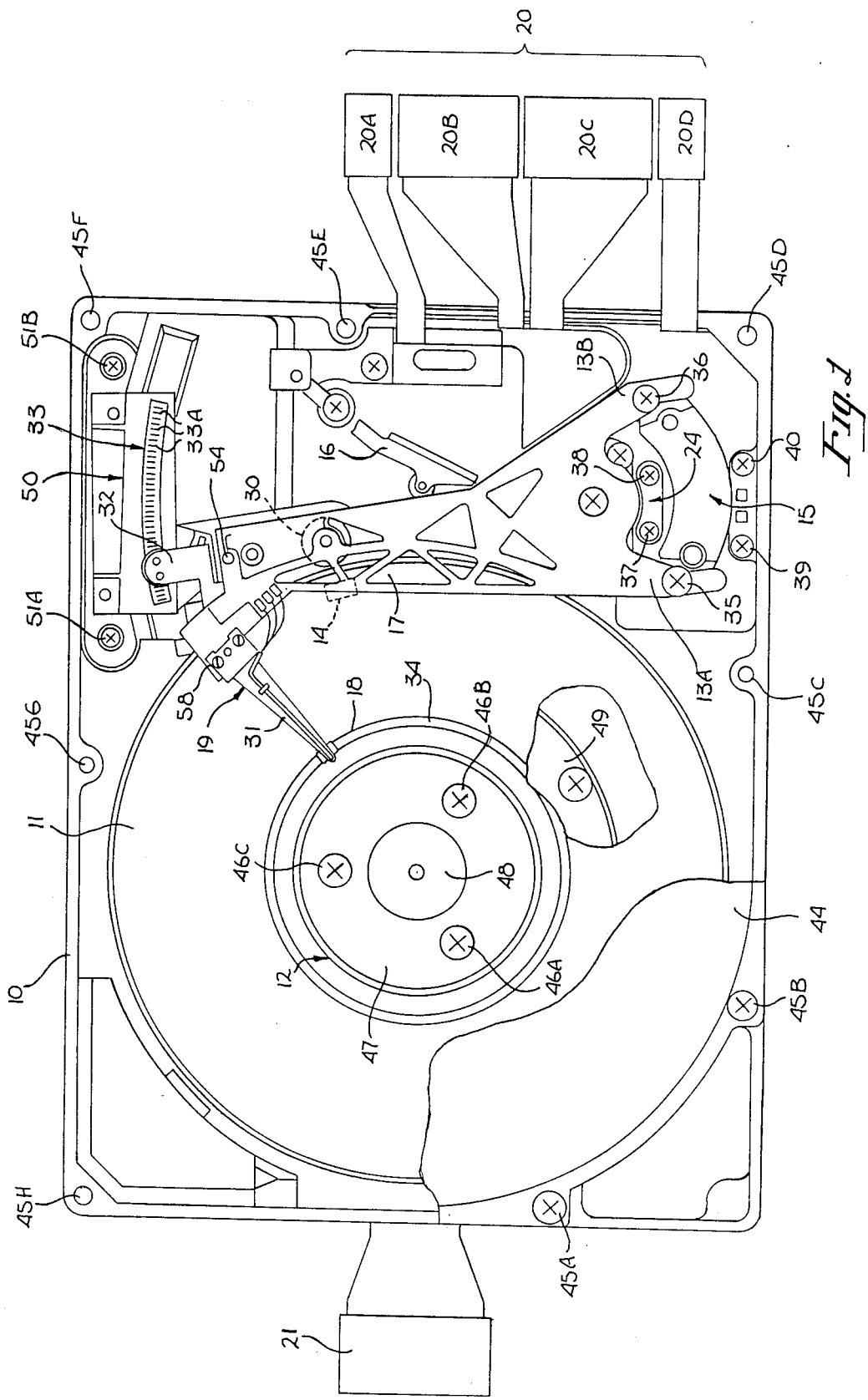
FIG. 1 is a plan view of the invented disk drive showing the arm assembly and parking brake.
Figure 2:
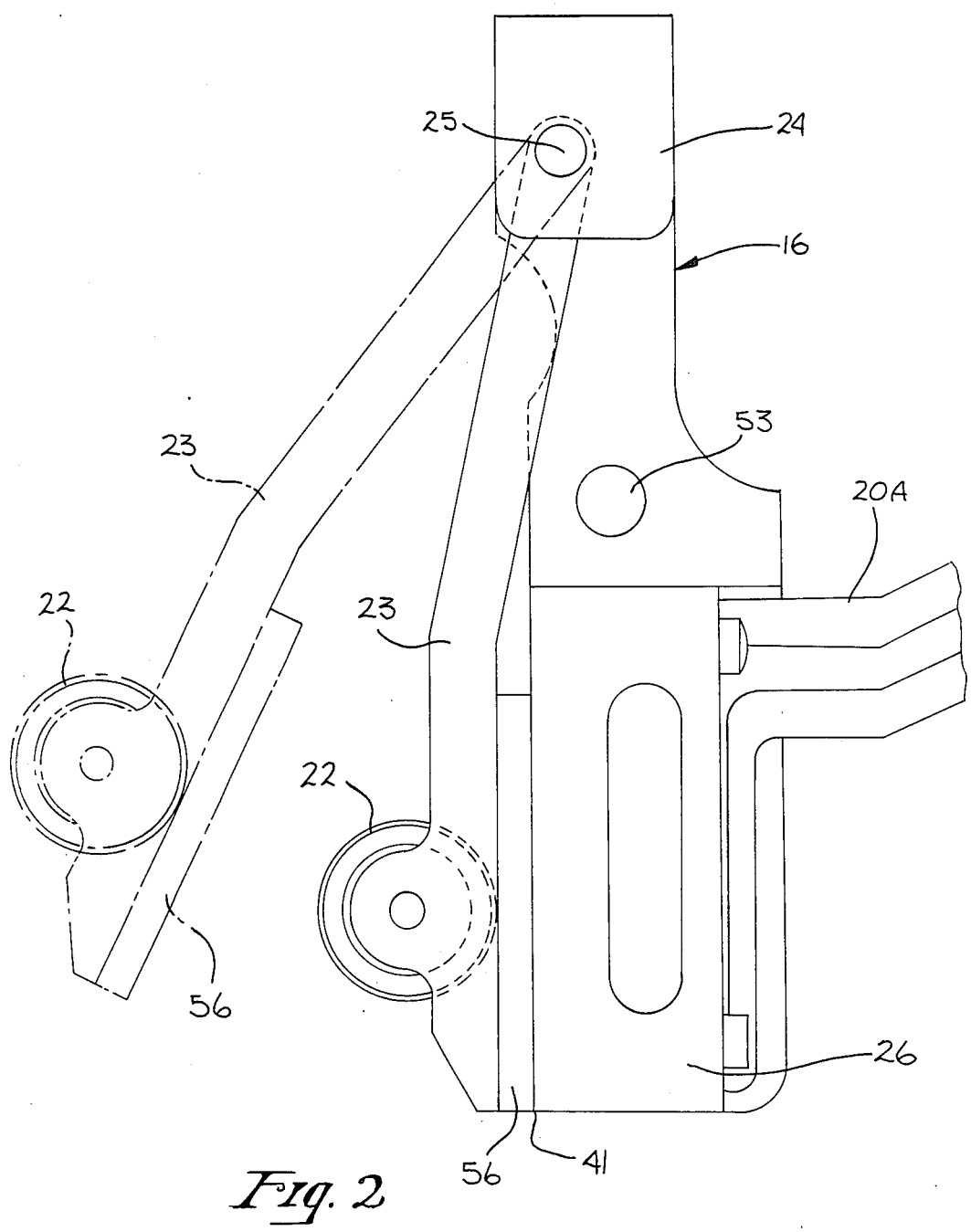
FIG. 2 is an expanded plan view of the parking brake assembly shown in FIG. 1.

The principal components of the invented disk drive are shown in FIG. 1 and generally comprise:

(1) a base 10;
(2) a hard disk 11;
(3) a spindle 12 holding the disk 11 in place;
(4) a drive arm 17;
(5) connecting cables 20 and 21;
(6) head/gimble assembly 19;
(7) a parking brake 16, and;
(8) an actuator motor assembly 15.

The actuator motor assembly is the subject of copending U.S. patent application No. 763,901 filed on Aug. 7, 1985 and assigned to the assignee of the present invention now U.S. Pat. No. 4,707,754.

Base

The base 10 is a metal casting which is a generally rectangular shaped shallow box. All the moving parts of the disk drive assembly are contained within the base 10 with only the connector cables 20A–20D and 21 extending beyond the base. Likewise none of the parts extend above the sides of the box defined by the base. As a result, a cover 44 (partially shown in FIG. 1) can be attached to the base at points 45A–H with screws. The cover 44 can be transparent or opaque, and serves to prevent dust and smoke from reaching the disk mechanisms. In addition to the holes 45A–H for attaching the cover 44, numerous other attaching points, bosses and the like are interally formed with the base 10, and are described below, where pertinent to the present invention.

Hard Disk

In the presently preferred embodiment, the hard disk 11 is a 5¼ inch double sided aluminum disk which is used to magnetically store data. Both sides are used for data storage, and are accessed by read/write heads 18. In the preferred embodiment of the present invention, a single disk is utilized for storage of 10 megabytes of information. However, the invention contemplates the addition of additional disks and the use of disks with increased capacity. Data is stored on the disk 11 in concentric rings such as ring 34, shown as an example. In addition, each ring contains "servo" information. This servo information is contained in a single "burst" of data at one location in the ring. Servo information is used to provide the host computer with knowledge of the position of the ring on the disk as well as the position of the read/write heads within the ring itself.

Data is stored digitally, as a series of "0s" or "1s" represented by pulses. A single bit of information is stored in a cell, with a cell defined by a single clock bit. In the preferred embodiment of the present invention, a cell either contains a data pulse representing a logical "1" or "0" and a clock pulse. Data pulses are distinguished from clock pulses by their position in the cell. The determination of the position of the pulse in the cell requires an accurate phase locked loop circuit, as is known in the art. The read/write head must be positioned very accurately when writing information so that during read operations a logical "1" will be properly read as a "1".

Head positioning can be accomplished by "coarse" positioning or "fine" positioning. In coarse positioning, some means of locating tracks, such as a focused LED optic scale system located near the heads, is used to determine when the desired track is approaching. At that point, the actuator motor is commanded to begin braking so that the head comes to rest over the desired track. In order to center the head directly over the desired track, servo information contained in the track itself is used to indicate whether the head is off to the left or the right. The actuator motor is then commanded to move in the appropriate direction to center the head exactly. For read operations, coarse positioning is usually sufficient. For write operations, it is desired to write the data in the center of the track, and therefore fine positioning is utilized.

Spindle Assembly

The spindle assembly 12 includes a disk hub 47 which clamps and holds the disk 11. The disk hub 47 is mounted on the shaft 48 which extends through the center of the disk 11 and is attached to the rotor 49. The spindle motor drives the rotor 49 which in turn rotates the disk 11. The spindle motor is controlled by a microprocessor and is not shown in detail, since such devices are well known in the prior art.

Drive Arm

As shown in FIG. 5, the arm 17 is a straight member having a generally U-shaped section 27 at one end, and openings 54 and 58 at the other end. Openings 29a and 29b, in either leg of the "U", serve as points of attachment for the actuator motor assembly. Openings 54 serve as points of attachment for the optic scale system. The arm 17 pivots about point 28 which is an opening for mounting the arm on a pivot means. The pivot means is not shown in detail since such means are well known in the prior art.

The arm 17 swings the heads back and forth over the surface of the disk 11. The arm 17 is prevented from swinging the heads beyond the inner radius of the disk 11 by the crash stop 14 (shown in FIG. 1). The crash stop 14 is a raised member extending from the base 10 below the disk 11. An elastic bumper 30 on the arm 17 contacts the stop 14 and prevents further movement. At this point the heads are disposed over a parking track. In order to prevent the arm from swinging beyond the outer radius of the disk 11, the parking brake 16 is situated so that, in its deactivated mode, the arm contacts it at a point at which the heads still lie over the surface of the disk 11.

Presently, the arm 17 is generally comprised of aluminum. As has been described above, one end of the arm is generally U-shaped and is used to mount the iron path and magnets as a counterbalance for the arm. The other end of the arm 17 includes opening 58 for mounting the head/gimble assembly 19. (shown in FIG. 1). The arm itself is disposed generally in line with a tangent to the hard disk with the head/gimble assembly extending along a radius of the disk. As shown by area 57 in FIG. 6, the arm is open along its length between the upper and lower surfaces in order to reduce mass and minimize inertia, and additionally to allow the arm to extend somewhat over the disk without contacting the disk. Triangular shaped indentations 56 are formed in the arm 17 to further reduce mass without sacrificing structural integrity. In the preferred embodiment, the arm is formed by casting and after machining has a mass of approximately 23 g. The total mass of the arm in the preferred embodiment with the magnet assembly and the head/gimble assembly attached is approximately 80 g.

Cables

The disk drive interfaces with a host computer through cables 20A-20D and cable 21 of FIG. 1. Cable 21 carries signals from the motor control circuit to the spindle motor to regulate the speed of the motor within 1% of the desired RPM.

The brake 16 is powered from the driver circuit board and receives signals on cable 20A.

Read/write commands and data transfers are carried by cables 20B and 20C while cable 20D controls the operation of the actuator motor.

Head/Gimble Assembly

Figure 7:
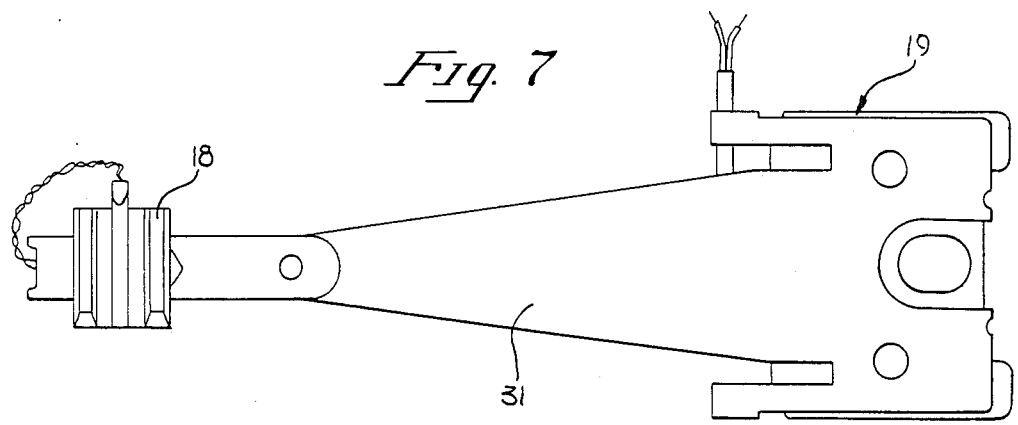
FIG. 7 is a top view of the head-gimble assembly of the present invention.
Figure 8:
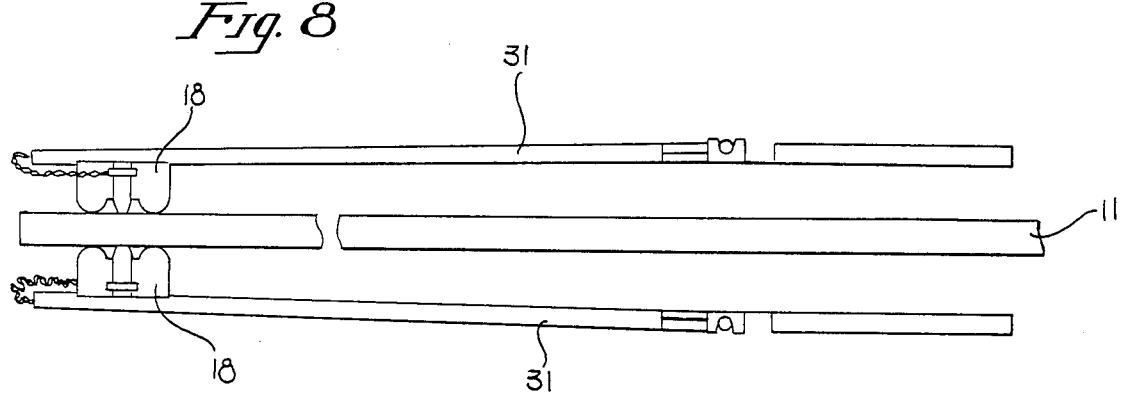
FIG. 8 is a side view of the head-gimble assembly of FIG. 7.

The head/gimble assembly 19 is comprised of read/write heads 18 and gimble arm 31 and is shown in FIGS. 7 and 8. As shown in FIG. 8, the heads 18 are disposed on either side of the disk so that information may be read and stored on both sides of the disk. The heads are attached to one end of the gimble arm 31, which is generally comprised of metal. As shown in FIG. 1, the other end of gimble arm 31 is mounted on the driver arm 17 at point 58. The gimble arm 31 is generally perpendicular to the driver arm 17. The gimble arm is disposed along a radius of the disk with the heads mounted on the end of the gimble arm 31 so that they are disposed on a tangent of each data track at all points along the radius of the disk. The heads must lie on a tangent so that only one circular track will be read as the disk spins beneath the head. A focused optic device which is used to count tracks and allow "coarse positioning" of the head assembly may be mounted beside the heads 18. The optics are connected to a single chip microcomputer which directs positioning. The microcomputer uses information from the optics to count the tracks and position the heads.

The heads 18 do not touch the surface of the disk 11, but ride on an "air bearing" of 17 to 20 microinches thickness. The need for enclosure of the disk drive assembly becomes most apparent here. The air bearing on which the heads fly is less than half the thickness of a particle of smoke. Should any contamination be present in the head/disk assembly, there is the possibility that it may get caught between the head and disk surface. There it will scratch the disk, destroying data and potentially causing a "head crash" where the head itself contacts the disk. A head crash not only causes permanent damage to an area of the disk, but the loss of data stored in the damaged area as well.

The air bearing is maintained by the speed of revolution of the hard disk 11. Therefore, when power is lost there is a chance of a head crash. The present invention includes tracks near the disk hub 47 where no information is stored. These tracks act as a parking area for the heads 18. Whenever a poweroff condition occurs, the parking brake 16 pushes the arm 17 and therefore the heads 18, to the parking tracks.

Parking Brake

The parking brake of the present invention is shown in FIGS. 1 through 4. The parking brake 16 consists of roller 22 mounted on arm 23, plate 56, coil spring 42 and solenoid 26. The arm 23 is shown in the locked position in FIG. 2 by solid lines and in the braking position by dashed lines. The entire parking brake assembly is mounted on the base 10 of the disk drive by means of a screw through hole 53.

The roller 22 consists of an elastomeric ring disposed on a hub 57. The hub 57 is held in place on the arm 23 by means of pin 58. The roller 22 rotates about pin 58 as the brake is engaged with the driver arm 17. The roller first contacts driver arm 17 at a first point and as it pushes the driver arm into the parked position, rolls along the length of the driver arm 17, coming to rest at a second point. The roller is elastomeric so as to reduce the shock when the parking brake meets the driver arm.

A coil spring 42 provides the bias which holds the brake in the braking position. The spring 42, shown in FIG. 3, provides a force to the arm 23 sufficient to hold the driver arm 17 in the parked position during shock and movement of the disk drive. However, the force can be overcome by the actuator motor once power is supplied to the disk drive.

The arm 23 includes plate 56 attached to the arm near the roller 22. The plate 56 is made of steel and is utilized to hold the brake in a locked position during operation of the disk drive. The plate 56 is held in place along interface 41 by solenoid 26. As shown in FIG. 4, solenoid 26 consists of windings 43 which are energized by current through line 52. Line 52 leads to cable 20A which is coupled to the host computer and controls the braking operations. When current is passed through windings 43, the solenoid 26 becomes an electromagnet whose magentic force holds the plate 56, and thus the arm 23, in place in a locked position.

The operation of the parking brake 16 of the present invention is as follows. During operation of the disk drive, the brake is held in a locked position by the magnetic force of the solenoid 26 acting on plate 56 of the brake arm 23. When the disk drive is shut off, or power is otherwise removed, the current in the solenoid 26 ceases, the arm 23 is released, and the spring 42 causes the brake arm to push the driver arm 17 into a parked position. When power is returned to the disk drive, the actuator motor automatically swings the driver arm 17 away from the disk. This in turn pushes the plate 56 of brake arm 23 against solenoid 26, where current in the solenoid provides magentic force to hold the brake in place.

Because the actuator motor is utilized to engage the brake arm 23 with the solenoid 26, the solenoid need not draw enough current to attract the arm 23 itself. The current drawn need only be great enough to hold the arm in place once it engages the solenoid. This reduces the power consumption of the parking brake of the present invention over prior art devices. In the preferred embodiment of the present invention, the solenoid draws less than 0.1 amps of current. Also, because the parking brake assembly is not mounted within the driver arm, the weight of the driver arm may be minimized, reducing inertia.

Optics Scale

Figure 9:
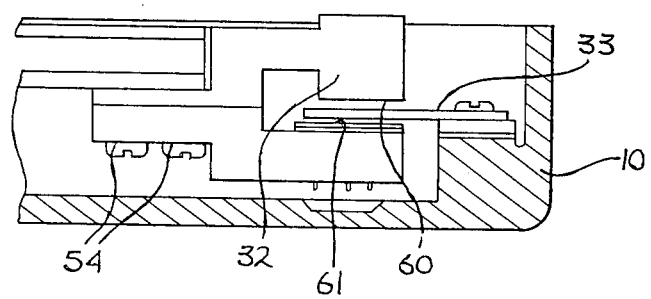
FIG. 9 is a cross-sectional view illustrating the optic scale system of FIG. 1.

Referring to FIG. 1, the scale 50 comprises a generally rectangularly shaped glass or other transparent material attached to the base 10 with screws 51A and 51B. The scale 50 includes a slotted member 33. A collimated LED 32 is disposed a slotted member 33. The LED 32 is attached to the arm 17 at point 54, located at the same end of the arm as the head gimble assembly. The extension 32 travels freely over member 33 during movement of the drive arm 17. The scale 50, as its name implies, provides a track location on the disk. The slotted member 33 contains openings, such as at 33a, which are used to enable tracks to be located on the disk 11. As shown in FIG. 9, the LED 32 is disposed on either side of slotted member 33. A light beam is passed between opposing faces 60 and 61 of the LED 32. This beam is interrupted by the solid material between slots in member 33. When the beam is over a slot, a circuit is completed and a signal whose magnitude depends on the amount of light reaching the lower face 61 is produced. The beam of light passing between faces 60 to 61 is approximately the same width as a slot of member 33. If only a portion of the light passes through a slot, a smaller signal is produced. Thus, as the LED 32 travels over a slot, a sinusoidal wave form is produced with a peak when the beam is directly over a slot. A certain point along the wave form can be defined as the point at which the center of a data track is accessed by the read/write heads 18. In his manner, the tracks may be located quickly and easily. Additionally, during movement of the read/write heads, the peaks can be counted, so that desired tracks may be found.

Thus, a parking brake has been described which provides secure and automatic parking of the driver arm of a disk drive during power-off situations. The brake does not require an excessive amount of power to be held in a disengaged position during operation of the disk drive. Additionally, by mounting the parking brake on the drive housing, the brake does not add to the weight of the driver arm. Although the invention has been described with reference to FIGS. 1-8, it will be appreciated that the Figures are for illustration only, and that the parking brake of the present invention has utility in numerous other applications.

I claim:

1. In a disk drive assembly having a driver arm including read/write heads mounted at one end thereof, positioning means for moving said driver arm, and a power source for providing power to said positioning means;
   a parking brake assembly for restraining said driver arm of said disk drive in a predetermined position when said power is removed from said disk drive comprising:
   an extended member pivotally mounted on said disk drive, biasing means for biasing said member against said driver arm thereby causing said driver arm to be urged by said member towards said predetermined position, said member restraining said driver arm in said predetermined position;
   holding means and a means for providing power to said holding means for holding said member apart from said driver arm while said power is provided to said disk drive and said holding means such that said holding means does not move said member from said predetermined position and releasing said member when said power is removed from said disk drive and said holding means;
   said positioning means moving said driver arm when said power is provided to said disk drive, thereby causing said driver arm to urge said member adjacent to said holding means, said holding means holding said member after said driver arm has moved said member adjacent to said holding means.

2. The parking brake as described by claim 1 wherein said biasing means comprises a spring disposed on said member.

3. The parking brake as defined by claim 1 wherein said holding means comprises an electro-magnet, said electro-magnet drawing current only when power is supplied to said disk drive.

4. The parking brake as described by claim 1 further including a roller disposed on said member for contacting said driver arm.

5. The parking brake as described by claim 4 wherein said roller comprises an elastomeric ring disposed on a hub, said hub coupled to said member.

6. In a disk drive assembly having a driver arm including read/write heads, disposed at one end thereof, positioning means for moving said driver arm, and a power source for providing power to said disk drive and said positioning means, a device for restraining said driver arm of said disk drive in a predetermined position when said power is removed from said disk drive comprising:
   an arm having a first and second end, said first end pivotally mounted on said disk drive;
   biasing means for biasing said second end of said arm against said driver arm thereby causing said driver arm to be urged by said arm towards said predetermined position, said biasing means disposed on said first end of said arm;
   an electromagnet disposed on said disk drive, said electromagnet holding said second end of said arm away from said driver arm while said power is provided to said disk drive and releasing said second end of said arm when said power is removed from said disk drive;
   said positioning means moving said driver arm when said power is provided to said disk drive, thereby causing said driver arm to urge said arm adjacent said electromagnet, said electromagnet holding said second end of said arm away from said driver arm;
   said electromagnet having a magnetic strength sufficient to hold said arm but insufficient to attract said arm from said predetermined position;
   whereby power consumption of said device is minimized.

7. The device as described by claim 6 wherein said biasing means comprises a coil spring.

8. The device as described by claim 6 wherein said biasing means comprises a leaf spring.

9. The device as described by claim 6 wherein said electromagnet generates a magnetic force sufficient to hold said arm in place.

10. The device as described by claim 6 further including a roller disposed on said second end of said arm, said roller contacting said driver arm when said power is removed from said disk drive.

11. The device as described by claim 6 wherein said roller consists of an elastomeric ring disposed on a hub, said hub mounted on said second end of said arm.

12. A disk drive comprising:
a base;
a drive assembly engaging and rotating at least one disk, said drive assembly mounted to said base;
a driver arm assembly pivotally mounted on said base;
at least one magnetic head mounted on said driver arm assembly for detecting signals stored on the surface of said disk, and for producing and storing signals on said disks;
an actuator motor for producing movement of said driver arm;
a power source for providing power to said actuator motor;
a parking brake mounted on said base and coupled to said power source, said parking brake for urging said driver arm to a predetermined position when said power is removed from said disk drive, said parking brake held in a locked position by an electromagnet when said power is supplied to said disk drive;
said actuator motor moving said driver arm when said power is supplied to said disk drive, thereby causing said driver arm to urge said parking brake adjacent said electromagnet, said electromagnet holding said parking brake in said locked position;
said electromagnet having a magnetic force sufficient to hold said parking brake is said locked position but insufficient to attract said parking brake from said predetermined position;
whereby power consumed by said electromagnet is minimized.

13. The disk drive as described by claim 12 wherein said parking brake further comprises:
a brake arm having a first and second end, said first end pivotally mounted to said base;
a roller disposed on said second end of said brake arm, said roller contacting said driver arm when power is removed from said drive;
a plate coupled to said second end of said brake arm, said plate abutting and held in place by said electromagnet when power is supplied to said disk drive.

14. The device as described by claim 13 wherein said actuator motor urges said driver arm against said brake arm such that said plate contacts said electromagnet.

15. The device as described by claim 12 wherein said electromagnet draws power only when power is supplied to said disk drive.

16. A method of restraining a biased member abutting a driver arm of a disk drive assembly, said driver arm having read/write heads disposed at one end thereof, said driver arm driven by an actuator motor, comprising the steps of:
providing power to said actuator motor;
providing power to an electromagnet such that a magnetic field is generated sufficient to restrain said biased member but insufficient to move said biased member;
utilizing said motor to move said driver arm, said driver arm in turn moving said biased member;
moving said biased member sufficiently within said magnetic field such that said biasing member is restrained;
moving said driver arm away from said biased member.

17. The method as described in claim 16 wherein said biased member comprises a pivotally mounted arm biased with a spring means.

18. A method for biasing and unbiasing a disk drive head arm, said disk drive head arm having read/write heads disposed at one end thereof, comprising the steps of:
biasing a pivotally mounted arm towards said head arm so as to collide with said head arm and bias said head arm towards a first position;
activating a disk drive head arm positioning motor in opposition to said bias so as to position said head arm and pivotally mounted arm in a second position;
restraining said pivotally mounted arm in said second position;
positioning said head arm in a plurality of positions between said first and second positions in response to said positioning motor so as to store and retrieve data; and
releasing said pivotally mounted arm.

19. A method as in claim 18 wherein said step of releasing said pivotally mounted arm is selectively taken in response to the removal of power from said disc drive.

* * * * *